United States Patent [19]

Buckler et al.

[11] 4,101,050
[45] Jul. 18, 1978

[54] FILLED-POLYSTYRENE LAMINATES

[75] Inventors: Ernest Jack Buckler; Michael Hugh Richmond, both of Sarnia, Canada

[73] Assignee: Polysar Limited, Sarnia, Canada

[21] Appl. No.: 723,285

[22] Filed: Sep. 14, 1976

[30] Foreign Application Priority Data

Oct. 22, 1975 [CA] Canada .................................. 238304

[51] Int. Cl.² .......................... B65D 1/00; B32B 27/08
[52] U.S. Cl. ................................. 229/3.5 R; 428/441;
428/497; 428/494; 428/158; 428/304; 428/308;
428/454; 428/310; 428/515; 428/516; 428/451;
428/517; 428/519; 428/443; 428/538; 260/37
R; 260/876 B; 260/42.57; 521/122; 521/123
[58] Field of Search .............. 428/158, 308, 515, 516,
428/517, 519, 304, 310, 457, 454, 35, 494, 497;
229/3.5 R, 43, 48 T; 260/2.5 AK, 37 R, 42.56,
42.57, 876 B

[56] References Cited

U.S. PATENT DOCUMENTS

| | | |
|---|---|---|
| 3,284,542 | 11/1966 | Carrock et al. ..................... 260/4 R |
| 3,413,249 | 11/1968 | Luftglass et al. ............. 260/42.57 X |
| 3,660,849 | 5/1972 | Jonnes et al. ..................... 428/308 X |
| 3,846,360 | 11/1974 | Needham ...................... 260/42.56 X |
| 3,861,994 | 1/1975 | Stark ................. 428/310 X |
| 3,916,076 | 10/1975 | Eastes .................................... 428/516 |
| 3,976,608 | 8/1976 | Buckler et al. ............... 260/42.56 X |
| 4,008,347 | 5/1977 | Amberg et al. ........................ 428/35 |

*Primary Examiner*—P. C. Ives
*Attorney, Agent, or Firm*—Stevens, Davis, Miller & Mosher

[57] ABSTRACT

Thermoplastic polystyrene laminates are disclosed, one of the layers of which comprises a filled polystyrene composition containing from about 5 to about 50 of filler, such as calcium carbonate, clay, asbestos, etc. The filled polystyrene composition is prepared from a filled polystyrene masterbatch of impact polystyrene, filler, rubber and mineral oil, cut back by mixing with other polystyrene, either crystal or impact polystyrene. Laminates may be prepared by coextrusion. The filled polystyrene layer may be foamed. The laminates may be used for making formed articles such as cups, containers, trays, plates, sheets, etc.

6 Claims, No Drawings

FILLED-POLYSTYRENE LAMINATES

This invention relates to layered thermoplastic products and processes for their preparation. More particularly, it relates to laminates of at least two layers of styrene polymer compositions.

For the manufacture of plastic formed articles such as food trays, beverage cups and the like, it is known to use thermoplastic laminates of different types of polystyrene. For example, one layer of the laminate may be impact polystyrene (rubber modified polystyrene) to confer impact strength on the finished article, and another layer may be of crystal polystyrene, to enhance the appearance, hardness and printability of the finished article. Instead of or in addition to either of these layers, there may be a layer of foam polystyrene, to impart insulating properties to the finished article.

However, recent petrochemical shortages have led to substantial increases in the cost of styrene monomer and hence polystyrene products, to the extent that, in many instances, polystyrene films and containers are no longer cheap, disposable items.

It has now been found tht styrene polymer laminates of good physical properties can be produced, with economic advantage, by using as one or more of the styrene polymer layers a blend of polystyrene, rubber, oil and filler, the blend comprising a mixture of a masterbatch or rubber, oil, filler and polystyrene, with additional polystyrene.

Thus according to the present invention there is provided a thermoplastic polymeric laminate comprising at least one layer of polystyrene, and at least one layer of filled styrene polymer composition containing from about 5 to about 50 parts by weight of filler, said filled styrene polymer composition being the product of mixing a styrene polymer masterbatch comprising impact polystyrene, filler, rubber and mineral oil, with polystyrene.

Laminates according to the present invention, containing a filled styrene polymer layer as defined, have been found to have physical properties at least comparable to those where a layer of polystyrene is used instead of the filled layer. Thus, the overall polystyrene content of the finished laminate is reduced by inclusion of cheaper fillers, thereby reducing the cost of the product without sacrifice of physical properties. By using as the filled styrene polymer layer a masterbatch containing impact polystyrene, filler, oil and rubber, cut back by addition of more polystyrene, a filled styrene polymer layer containing relatively large amounts of filler evenly dispersed in the composition forming the filled layer is achieved.

Except for some speciality applications such as fibre reinforcement, it has not previously been found practical to prepare filled polystyrene compositions. In contrast with synthetic rubbers, the presence of filler has not been required to confer good strength properties on polystyrene. In fact, mineral fillers incorporated directly into polystyrene are known generally to cause reduction in the strength characteristics of the mixture. Incorporation of fillers into a polymeric material has the disadvantage that it has been necessary to use high shear mixing equipment to prepare the filled compositions, with consequent increase in the energy requirements for the mixing process. Further, since the specific gravity of mineral fillers is generally higher than that of the polystyrene, the use of such mineral fillers as a partial replacement of polystyrene in a polystyrene composition would yield a more dense material having no volume advantage.

According to the present invention, however, it has been discovered that thermoplastic polymer laminates of acceptable properties can be prepared using at least one layer of polystyrene and at least one layer of filled styrene polymer blend, the filled polystyrene blend comprising polystyrene, filler, rubber and mineral oil, and prepared from a masterbatch as previously defined. Such blends can be made readily and economically, using standard processing equipment. The resulting laminates can present cost savings over those consisting essentially of polystyrene alone.

The filled polystyrene blend used in the laminates of the invention comprise: a filled polystyrene masterbatch which is cut back by mixing with at least one other polystyrene, the filled polystyrene masterbatch containing 100 parts by weight of impact polystyrene, at least one filler in an amount of from about 10 to about 200 parts by weight, at least one rubber in an amount of from about 1 to about 40 parts by weight, and mineral oil in an amount of from about 1 to about 40 parts by weight. This masterbatch is then mixed with at least one other polystyrene which may be an impact polystyrene or a crystal polystyrene or both in amounts such that the final mixture contains at least 5 parts by weight but not more than 50 parts by weight of filler per 100 parts by weight of the mixture.

Examples of suitable fillers for use in the laminates of the present invention include the inorganic mineral fillers such as calcium or magnesium carbonates, calcium sulphate, aluminum oxide and hydrates thereof, clays, aluminum silicate, silica, talc, mica, wollastonite, vermiculite, asbestos fibres and glass fibres. Suitable fillers also include naturally derived products such as particulate starch, wood sawdust and various wood flours, peanut shell husks and such materials normally considered as waste products. Also included as suitable fillers are the small sized essentially spherical glass beads having an average diameter range of about 10 to about 60 microns. Mixtures of these fillers may also be used, for example mixtures of glass beads and an inorganic mineral filler are suitable. The fillers may be used as such or may be treated as with coupling agents.

Examples of suitable rubbers include styrenebutadiene rubbers containing up to 45 weight per cent of bound styrene, a styrene-butadiene rubber being a blended product containing an average of from 40 to 60 weight percent of bound styrene and being a blend of (a) styrenebutadiene rubber containing from 15 to 35 weight percent of bound styrene and (b) styrene-butadiene polymer containing from 75 to 95 weight percent of bound styrene, polybutadiene rubber, high cis-1,4 polyisoprene, natural rubber, thermoplastic rubbery block copolymers comprising vinyl or vinylidene-substituted aromatic hydrocarbon polymer blocks and conjugated diolefin polymer blocks, ethylene-propylene-diene rubbers or mixtures thereof. Preferred rubbers include the styrene-butadiene rubbers, the polybutadienes and the thermoplastic rubbery block copolymers.

Examples of suitable oils include the mixed naphthenic-aromatic oils, and, when colour is not a problem, the highly aromatic oils.

In preparing the filled polystyrene blends used in the laminates of the present invention, a masterbatch is formed of a first part of an impact polystyrene, with the filler, oil and rubber, and the masterbatch is then mixed with the remainder of the polystyrene, to form the blend ready for lamination. The first part of polystyrene, i.e. that used to prepare the masterbatch, is an impact polystyrene containing 1 to 15 weight percent of a rubber selected from polybutadiene, polyisoprene, thermoplastic rubber block vinylidene aromatic hydrocarbon-conjugated diolefin polymers and ethylene-propylene-diene rubber as hereinbefore described. The impact polystyrene must contain some grafted rubber and does not include mechanical blends of crystal polystyrene with rubber. The amount of rubber blended with the impact polystyrene to form the masterbatch is from 1 part by weight to about 40 parts by weight based on 100 parts by weight of the impact polystyrene. Preferred amounts of rubber are from about 5 parts to about 25 parts by weight per 100 parts by weight of the impact polystyrene. Quantities of filler added to the impact polystyrene to form the masterbatch are from 10 to 200 parts by weight, preferably from 25 to 125 parts by weight, per 100 parts by weight of impact polystyrene. The amount of oil added to the impact polystyrene to form the masterbatch is from 1 to 40 parts, preferably from 5 to 25 parts, by weight per 100 parts by weight of impact polystyrene.

The masterbatch of impact polystyrene, rubber, filler and oil according to the preferred embodiment of the invention may be prepared by any suitable method wherein the impact polystyrene can be melted or fluxed and the other components can be well mixed with and dispersed in the molten polystyrene. For example, the high impact polystyrene can be fed to a hot two roll mill, maintained at a temperature of at least 110° C to about 160° C, preferably from 120° C to about 150° C, fluxed on the mill rolls and the rubber, filler and oil added separately or as a combination of any two or three components. The mixture is maintained on the hot mill rolls until a good dispersion is obtained. The masterbatch can also be prepared in an internal mixer such as a Banbury mixer or a Farrel continuous mixer, using a temperature of about 110° C to about 200° C, preferably from about 130° C to 175° C. The masterbatch can also be prepared in an extruder provided that adequate mixing is achieved with the extruder.

In accordance with the present invention the styrene polymer masterbatch is cut back by mixing with a polystyrene composition selected from either or both of crystal polystyrene and impact polystyrene. Various grades of crystal polystyrene can be used. An impact polystyrene, when used, will usually contain a relatively low proportion of rubber, e.g. less than about 10 weight %. The exact nature of the polystyrene composition which is mixed with the masterbatch is dependent more on cost and availability of the polystyrene composition. The proportions of masterbatch and polystyrene composition which are used to form the blend for making the laminates according to the present invention depend on the composition of the masterbatch and the desired properties of the blend. Generally, it is preferred that the blend should contain at least about 5 parts by weight of filler per 100 parts by weight of blend. Other additions can also be incorporated, such as antistatic agents, colorants, etc. Blowing agents may be incorporated if it is desired to produce a foamed product.

The process for mixing the masterbatch with the polystyrene to form the blend ready for laminating purposes is generally in accordance with known plastics mixing procedures. The masterbatch is preferably supplied to this mixing operation in pellet form. The mixing with the polystyrene composition can then be achieved with equipment readily available in the thermoplastics industry. Pellet form masterbatch can be dry mixed with pellet form polystyrene in a tumbler mixer, and the mixed pellets then fed to the shaping equipment, optionally via a heated extruder.

According to the present invention, laminates are made using at least one layer of polystyrene, and at least one layer of filled polystyrene blend previously described. The polystyrene layer used is preferably of crystal polystyrene, optionally modified to confer antistatic properties thereon. The polystyrene layer may vary in thickness from a very thin layer to a layer forming nearly 50% of the thickness of the laminate. A preferred form of laminate according to the present invention comprises two outer layers, each of polystyrene which may be either of crystal polystyrene or impact polystyrene, and a central layer of filled polystyrene blend. In a most preferred embodiment, one of the outer layers is crystal polystyrene and the other outer layer is impact polystyrene, the central layer being the filled polystyrene blend. Laminates of the present invention may be made by processes known in the art but are preferably made by a process of coextrusion, whereby the polymeric compositions to form the layers of the laminate are fed separately to an extruder, arranged in the desired order of layers prior to extrusion, as adjacent streams of different polymeric composition, and extruded together through a common die in laminate arrangement. Such processes of coextrusion are well known in the art. The laminates of the present invention can be readily formed by coextrusion and by the joining together of layers of each composition. If desired, adhesive may be provided between the layer of the laminate.

Of particular interest and significance in the present invention, there are provided polystyrene laminates comprising at least one layer of a foamed filled polystyrene blend. These are prepared by incorporating a suitable amount of a blowing agent into the filled polystyrene blend. The blowing agent may be of the chemical type such as azodicarbonamide, benzene sulphonyl hydrazide and azobisformamide, or may be a volatile chemical such as pentane. The blowing agent may be incorporated as a powder directly into the masterbatch or may be incorporated as a pre-prepared masterbatch with polystyrene, blended into the masterbatch, or blended into the masterbatch together with the polystyrene added to cut back the masterbatch. Foaming will occur on extrusion of the laminate. It has been found that such foamed blends can be readily laminated with one or more layers of polystyrene, e.g. by coextrusion, to form sheets having a advantageous combination of rigidity and toughness characteristics, together with very light weight. Such laminates can be formed and molded into plastics products such as containers having a desirable combination of properties, together with reduced costs.

The laminates of the present invention are useful for making formed thermoplastic articles such as containers, cups, trays, sheets, decorative articles, ornaments, toys, etc. They can be formed by known techniques such as thermoforming.

The invention will be further described with reference to the following specific examples.

EXAMPLE 1

A polystyrene masterbatch composition was prepared from the following ingredients:
impact polystyrene: 40 parts by weight
calcium carbonate (mineral filler): 50 parts by weight
polybutadiene (about 98% cis-1,4 content): 7 parts by weight
mineral oil: 3 parts by weight The masterbatch composition was prepared by mixing in a model 3D Banbury internal mixer. With the steam supply to the mixer turned on with the rotor operating at 35 rpm, the ingredients were added, as quickly as possible one after the other in the order, polystyrene, polybutadiene, calcium carbonate and oil, the ram was lowered and the contents were mixed for about six minutes at which time the contents had reached a temperature of about 140° C. The contents were dropped onto a two roll mill, the rolls of which had been preheated to about 145° C, and sheeted out as slabs from the mill. When the slabs had cooled they were granulated into pellets.

Next, the masterbatch composition was mixed with impact polystyrene and crystal polystyrene, to form a masterbatch blend of the following composition:
filled polystyrene masterbatch: 40 parts by weight
impact polystyrene: 44.8 parts by weight
crystal polystyrene: 15.2 parts by weight This mixing was achieved by adding pellets of the masterbatch to pellets of the impact polystyrene and the crystal polystyrene in a tumbler mixer and the so-mixed pellets were fed to an extruder.

The mixed pellets were then coextruded together with crystal polystyrene into a laminated sheet with a single layer of the masterbatch blend and a single layer of crystal polystyrene. The laminate was formed by a coextrusion process, in which the two polymeric substances were extruded separately and brought together to form a laminate having two discrete layers, one of each polymeric composition. It was found that the layers adhered together satisfactorily. The masterbatch blend was found to be readily extrudable, and no problems were experienced in thermoforming cups and containers from the resulting laminate. Sheets of about 1.4 to 1.5 millimeter thickness were thermoformed in a deep draw process into coffee cups which were found to be at least as good as the thinwalled polystyrene coffee cups available on the market.

EXAMPLE 2

In this Example, a 4-part laminate was prepared, having a first layer of crystal polystyrene, a second layer of high impact polystyrene, a third layer of a mixture of filled polystyrene masterbatch and high impact polystyrene, and a fourth layer of high impact polystyrene.

The filled polystyrene masterbatch composition of Example 1 was dry blended with impact polystyrene to give the following composition:
impact polystyrene: 52 parts by weight
calcium carbonate: 40 parts by weight
polybutadiene (about 98% cis-1,4 content): 5.6 parts by weight
mineral oil: 2.4 parts by weight Coextrusion to form a four layer laminate was effected by separately feeding the components of each layer to separate extruders and by bringing them together to form a laminate having a first layer of crystal polystyrene, a second layer of high impact polystyrene, a third layer of masterbatch-impact polystyrene blend and a fourth layer of impact polystyrene. Adhesion between the various layers was good. It was found that the four layer laminate so produced could be readily thermoformed into cups, containers and plates.

EXAMPLE 3

In this Example, a four part coextruded laminate was prepared substantially as described in Example 2.

A dry pellet mixture was prepared of 50 parts by weight of the masterbatch of Example 1 and 50 parts by weight of reground laminate of Example 2, the overall composition of the mixture being calculated to be:
polystyrene (impact and crystal): 58 parts by weight
calcium carbonate (mineral filler): 35 parts by weight
polybutadiene (about 98% cis-1,4 content): 4.9 parts by weight
mineral oil: 2.1 parts by weight A four part coextruded laminate was prepared as in Example 2, having a first layer of crystal polystyrene, a second layer of impact polystyrene, a third layer of the dry pellet mixture as described above, and a fourth layer of impact polystyrene. This four layer system was coextruded and thermoformed without difficulty. This Example illustrates that a filled polystyrene composition laminate according to the present invention can be recycled and reprocessed, so as to avoid excessive waste of material during processing and forming.

EXAMPLE 4

A polystyrene composition was prepared by mixing 80 parts by weight of the masterbatch of Example 1 with 20 parts by weight high impact polystyrene, by dry pellet mixing, as described in Example 1, and 0.5 parts of a blowing agent in powder form, azo-dicarbamide, was incorporated.

The blend was coextruded to form a four layer laminate, having a first outer layer of crystal polystyrene, a second layer of high impact polystyrene, a third layer of foamed polystyrene blend and a fourth, outer layer of crystal polystyrene, as described in Example 2. Foaming of the third layer took place as the laminate left the extruder. A filled foam laminated sheet of satisfactory properties was produced without difficulty. The sheet had a specific gravity of 0.94. The sheet was readily pressure formed into plastic containers having a very good combination of rigidity, weight and toughness. This Example shows that the polystyrene blend containing rubber, filler and oil can be satisfactorily foamed and coextruded.

What is claimed is:

1. A thermoplastic polymeric laminate comprising at least one layer of polystyrene and at least one layer of filled styrene polymer composition containing from about 5 to about 50 parts by weight of filler, said filled styrene polymer composition being the product of mixing a styrene polymer masterbatch with polystyrene, said masterbatch comprising 100 parts by weight of impact polystyrene, from 1 to about 40 parts by weight of rubber selected from styrene-butadiene rubber, polybutadiene rubber, high cis-1,4-polyisoprene, thermoplastic rubber block copolymers comprising vinyl- or vinylidene-substituted aromatic hydrocarbon polymer blocks and conjugated diolefin polymer blocks, ethylene-pripylene-diene rubber and mixtures thereof, from 10 to 200 parts by weight of filler being an inorganic mineral filler selected from calcium carbonate, magnesium carbonate, calcium sulphate, aluminum oxide and hydrates thereof, clay, aluminum sulphate, silica, talc, mica, wollastonite, vermiculite, asbestos fibres and glass fibres, and from 1 to 40 parts by weight of mineral oil selected from a mixed naphthenic-aromatic oil and an aromatic oil.

2. The laminate of claim 1 wherein the masterbatch comprises 100 parts by weight of impact polystyrene, from about 5 to about 25 parts by weight of rubber, from 25 to 125 parts by weight of filler, and from 5 to 25 parts of weight of mineral oil.

3. The laminate of claim 1 comprising a first outer layer of polystyrene, a central layer of filled styrene polymer composition and a second outer layer of polystyrene.

4. The laminate of claim 3 wherein said first outer layer is polystyrene and said second outer layer is impact polystyrene.

5. The laminate of claim 3 wherein the layer of filled sytrene polymer composition is foamed.

6. Cups, trays, plates and containers formed from the laminate of claim 3.

* * * * *